United States Patent
Bestgen et al.

(10) Patent No.: US 9,229,969 B2
(45) Date of Patent: *Jan. 5, 2016

(54) MANAGEMENT OF SEARCHES IN A DATABASE SYSTEM

(71) Applicant: International Business Machines Corporation, Armonk, NY (US)

(72) Inventors: Robert J. Bestgen, Rochester, MN (US); Daniel E. Beuch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/833,288

(22) Filed: Mar. 15, 2013

(65) Prior Publication Data
US 2014/0258264 A1    Sep. 11, 2014

Related U.S. Application Data

(63) Continuation of application No. 13/793,451, filed on Mar. 11, 2013.

(51) Int. Cl.
*G06F 17/30* (2006.01)

(52) U.S. Cl.
CPC .... *G06F 17/30336* (2013.01); *G06F 17/30442* (2013.01)

(58) Field of Classification Search
CPC .............. G06F 17/30289; G06F 17/30424; G06F 17/30575; G06F 17/30212; G06F 17/30321
USPC .................................. 707/609, 610, 618, 696
See application file for complete search history.

(56) References Cited

U.S. PATENT DOCUMENTS

| | | | |
|---|---|---|---|
| 5,535,385 | A | 7/1996 | Griffin et al. |
| 5,826,257 | A | 10/1998 | Snelling, Jr. |
| 5,926,813 | A | 7/1999 | Chaudhuri et al. |
| 5,950,186 | A | 9/1999 | Chaudhuri et al. |
| 6,026,406 | A | 2/2000 | Huang et al. |
| 6,047,298 | A | 4/2000 | Morishita |
| 6,098,075 | A | 8/2000 | Becraft, Jr. et al. |

(Continued)

FOREIGN PATENT DOCUMENTS

EP    2144177 A2    1/2010

OTHER PUBLICATIONS

Bestgen, et al., "Database Management Delete Efficiency". U.S. Appl. No. 13/763,971, filed Feb. 11, 2013.

(Continued)

*Primary Examiner* — Monica Pyo
(74) *Attorney, Agent, or Firm* — Scott A. Berger; James R. Nock

(57) ABSTRACT

A method, system, and computer program product to efficiently search a database is disclosed. The method, system, and computer program product may include structuring the database to have a table, an index associated with the table, and a log associated with the index, the log adapted to include an entry. The method, system, and computer program product may include receiving a search request related to the index. The method, system, and computer program product may include searching the index when the search request is not associated with the entry. The method, system, and computer program product may include accounting for the entry and searching the index when the search request is associated with the entry.

12 Claims, 4 Drawing Sheets

(56) References Cited

U.S. PATENT DOCUMENTS

| | | | |
|---|---|---|---|
| 6,651,075 B1 | 11/2003 | Kusters et al. | |
| 6,675,157 B1 | 1/2004 | Mitchell | |
| 7,490,084 B2 | 2/2009 | Kothuri et al. | |
| 7,593,341 B1 | 9/2009 | Buriol et al. | |
| 7,644,107 B2 | 1/2010 | Neagovici-Negoescu et al. | |
| 8,032,503 B2 | 10/2011 | Bouloy et al. | |
| 8,140,495 B2 | 3/2012 | Carlin et al. | |
| 8,161,015 B2 | 4/2012 | Kennedy et al. | |
| 8,352,422 B2* | 1/2013 | Prahlad et al. | 707/609 |
| 8,504,758 B1 | 8/2013 | McHugh et al. | |
| 2002/0052872 A1 | 5/2002 | Yada | |
| 2002/0198867 A1* | 12/2002 | Lohman et al. | 707/3 |
| 2003/0037042 A1 | 2/2003 | Kametani | |
| 2003/0126116 A1* | 7/2003 | Chen et al. | 707/3 |
| 2005/0283485 A1 | 12/2005 | Blaicher et al. | |
| 2007/0124303 A1 | 5/2007 | Dettinger et al. | |
| 2007/0174309 A1 | 7/2007 | Pettovello | |
| 2007/0280199 A1 | 12/2007 | Rong | |
| 2008/0077584 A1 | 3/2008 | Bachmann et al. | |
| 2008/0098020 A1 | 4/2008 | Gupta et al. | |
| 2009/0055638 A1 | 2/2009 | Nakano et al. | |
| 2009/0063400 A1 | 3/2009 | Borkar et al. | |
| 2009/0064160 A1 | 3/2009 | Larson et al. | |
| 2009/0210413 A1 | 8/2009 | Hayashi et al. | |
| 2010/0036864 A1 | 2/2010 | Augenstein et al. | |
| 2010/0106682 A1 | 4/2010 | Pauly | |
| 2010/0161553 A1 | 6/2010 | Park et al. | |
| 2011/0071986 A1 | 3/2011 | Schmidt et al. | |
| 2011/0145188 A1* | 6/2011 | Vachuska | G06F 17/30336 707/610 |
| 2012/0016881 A1 | 1/2012 | Hrle et al. | |
| 2012/0136869 A1 | 5/2012 | Kaufmann et al. | |
| 2013/0185281 A1 | 7/2013 | Joppa et al. | |
| 2013/0268498 A1 | 10/2013 | Sisco et al. | |
| 2013/0275367 A1* | 10/2013 | Shuma et al. | 707/609 |
| 2013/0318131 A1 | 11/2013 | Reisman | |
| 2014/0172783 A1* | 6/2014 | Suzuki et al. | 707/609 |

OTHER PUBLICATIONS

Bestgen, et al., "Management of Updates in a Database System", U.S. Appl. No. 13/793,216, filed Mar. 11, 2013.
303005, RD, A, Jul. 10, 1989, Anonymous.
Graefe, G., "Sorting and Indexing with Partitioned B-Trees", Proceedings of the 2003 CIDR Conference, pp. 1-13.
Bestgen, R., et al., "Management of Searches in a Database System", U.S. Appl. No. 13/793,451. Filed Mar. 11, 2013.
Bestgen, R., et al., "Management of Updates in a Database System", U.S. Appl. No. 13/833,016. Filed Mar. 15, 2013.
Bestgen, R., et al., "Database Management Delete Efficiency", U.S. Appl. No. 13/795,262. Filed Mar. 12, 2013.

* cited by examiner

MANAGEMENT OF SEARCHES IN A DATABASE SYSTEM

CROSS-REFERENCE TO RELATED APPLICATIONS

This application is a continuation of co-pending U.S. patent application Ser. No. 13/793,451, filed Mar. 11, 2013. The aforementioned related patent application is herein incorporated by reference in its entirety.

TECHNICAL FIELD

This disclosure relates generally to computing systems and, more particularly, relates to database management systems.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. A database administrator may desire to maintain the database by adding, deleting, or changing a record in the database. The database may need to be available for queries. It may be desirable for searching to be performed efficiently.

SUMMARY

A method, system, and computer program product to efficiently search a database is disclosed. The method, system, and computer program product may include structuring the database to have a table, an index associated with the table, and a log associated with the index, the log adapted to include an entry. The method, system, and computer program product may include receiving a search request related to the index. The method, system, and computer program product may include searching the index when the search request is not associated with the entry. The method, system, and computer program product may include accounting for the entry and searching the index when the search request is associated with the entry.

Aspects of the disclosure may include structuring a database that may include one or more tables and one or more indexes. Aspects of the disclosure may promote efficient search performance. Aspects of the disclosure may reduce repetitive searches. Aspects of the disclosure may "batch-up" index maintenance, performing multiple additions, deletions, or changes at once. Aspects of the disclosure may include a log associated with the index. Aspects of the disclosure may include the log adapted to include an entry. Aspects of the disclosure may include sorting or ordering entries of the log associated with the index. Aspects of the disclosure may reduce a working set memory size. Aspects of the disclosure may reduce I/O on indexes. Aspects of the disclosure may reduce overall I/O of index maintenance operations. Aspects of the disclosure may reduce CPU consumption.

DETAILED DESCRIPTION

Figure 1:
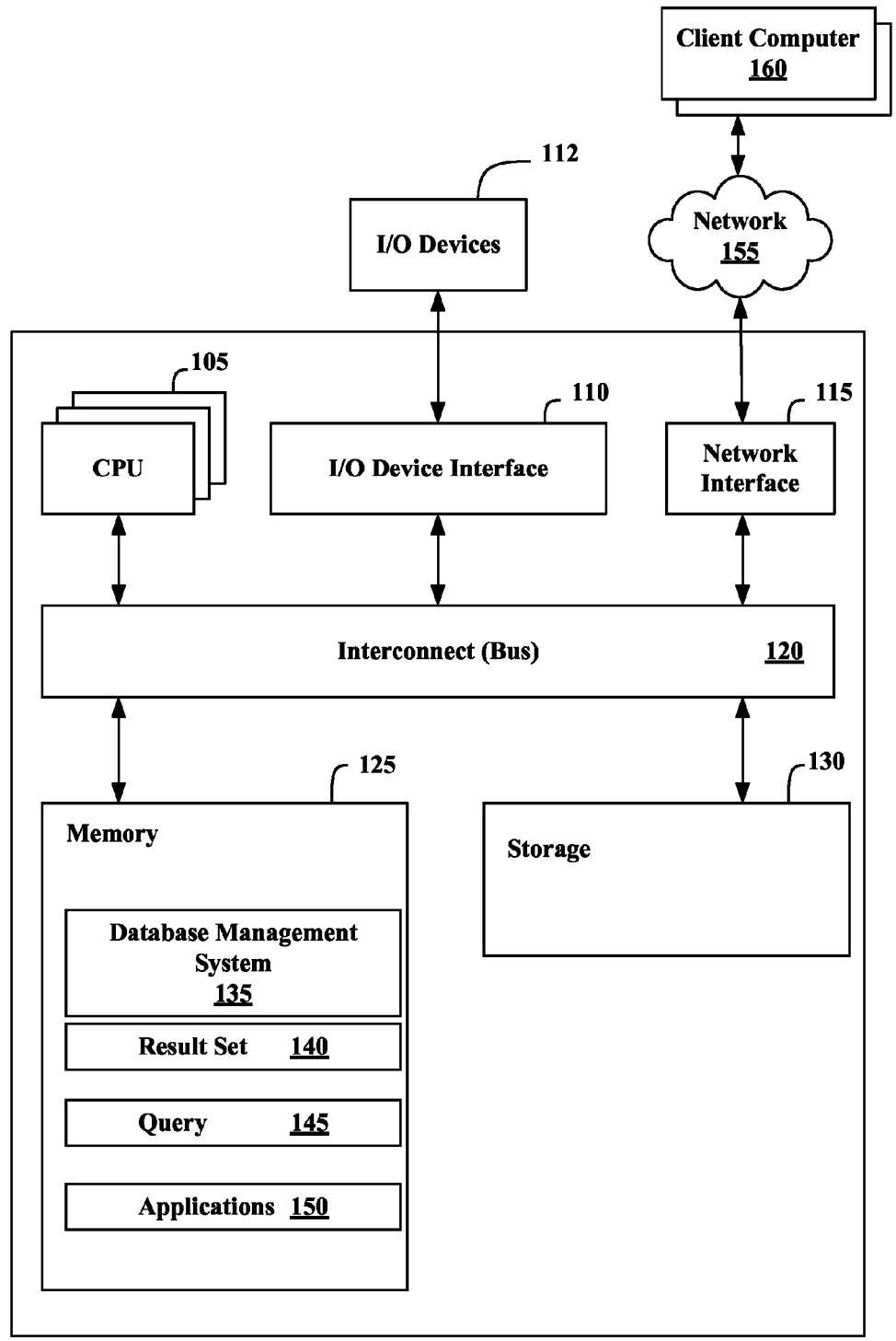
FIG. 1 illustrates an example representation of a computer system connected to a client computer via a network according to an embodiment.

A database administrator may desire to maintain the database by adding, deleting, or changing a record in the database. The database administrator may have a small maintenance window. Maintaining a large amount of data may take an amount of time and performance overhead that is not insignificant. The maintenance may need to occur in real-time while applications remain active, available for a search. It may be desirable for the search to occur with performance not negatively impacted by maintenance activities. It may be desirable for searches to be performed efficiently.

A time-consuming aspect of maintenance may be index maintenance. In adding, deleting, or changing one or more rows from a table, indexes associated with the one or more rows may be updated. Index maintenance may enable the indexes to remain available and updated for searching (i.e., query access). Updated indexes may enable accurate search results.

Significant input-output (I/O) may result from index maintenance depending on factors such as memory size and the size of the indexes over the table. Significant I/O may lead to increased search time. Significant I/O may result in costs to the database administrator such as decreased performance. Decreased performance due to index maintenance may be a performance penalty. Reducing the performance penalty may enable improved search performance which may result from efficient index maintenance.

Aspects of the disclosure may include structuring a database that may include one or more tables and one or more indexes. Aspects of the disclosure may promote efficient index maintenance. Aspects of the disclosure may make access to indexes more predictable. Aspects of the disclosure may "batch-up" index maintenance, performing multiple additions, deletions, or changes at once. Aspects of the disclosure may include a log associated with the index. Aspects of the disclosure may include the log adapted to include an entry. Aspects of the disclosure may include sorting or ordering entries of the log associated with the index. Aspects of the disclosure may include sorting or ordering entries of the log associated with the index as the entries are entered into the log. Aspects of the disclosure may involve ordering the additions, deletions, or changes to be made. Aspects of the disclosure may reduce a working set memory size. Aspects of the disclosure may reduce I/O on indexes. Aspects of the disclosure may reduce overall I/O of index maintenance operations. Aspects of the disclosure may reduce CPU consumption.

Aspects of the disclosure may promote efficient search performance. Aspects of the disclosure may reduce repetitive searches. Aspects of the disclosure may include receiving a search request. Aspects of the disclosure may include determining if the search request is associated with the entry. Aspects of the disclosure may include searching the index when the search request is not associated with the entry. Aspects of the disclosure may include accounting for the entry when the search request is associated with the entry. Aspects of the disclosure may include accounting for the entry which may include performing index maintenance.

Aspects of the disclosure may include accounting for the entry and searching the index when the search request is associated with the entry.

Aspects of the disclosure may include determining if the log associated with the index is empty. Aspects of the disclosure may include searching the index when the log is empty. Aspects of the disclosure may include accounting for the entry when the log is not empty. Aspects of the disclosure may include accounting for the entry which may include performing index maintenance. Aspects of the disclosure may include accounting for the entry and searching the index when the log is not empty. Aspects of the disclosure may include accounting for the entry which may include searching the log. Aspects of the disclosure may include accounting for the entry which may include merging a searching of the log with a search of the index.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
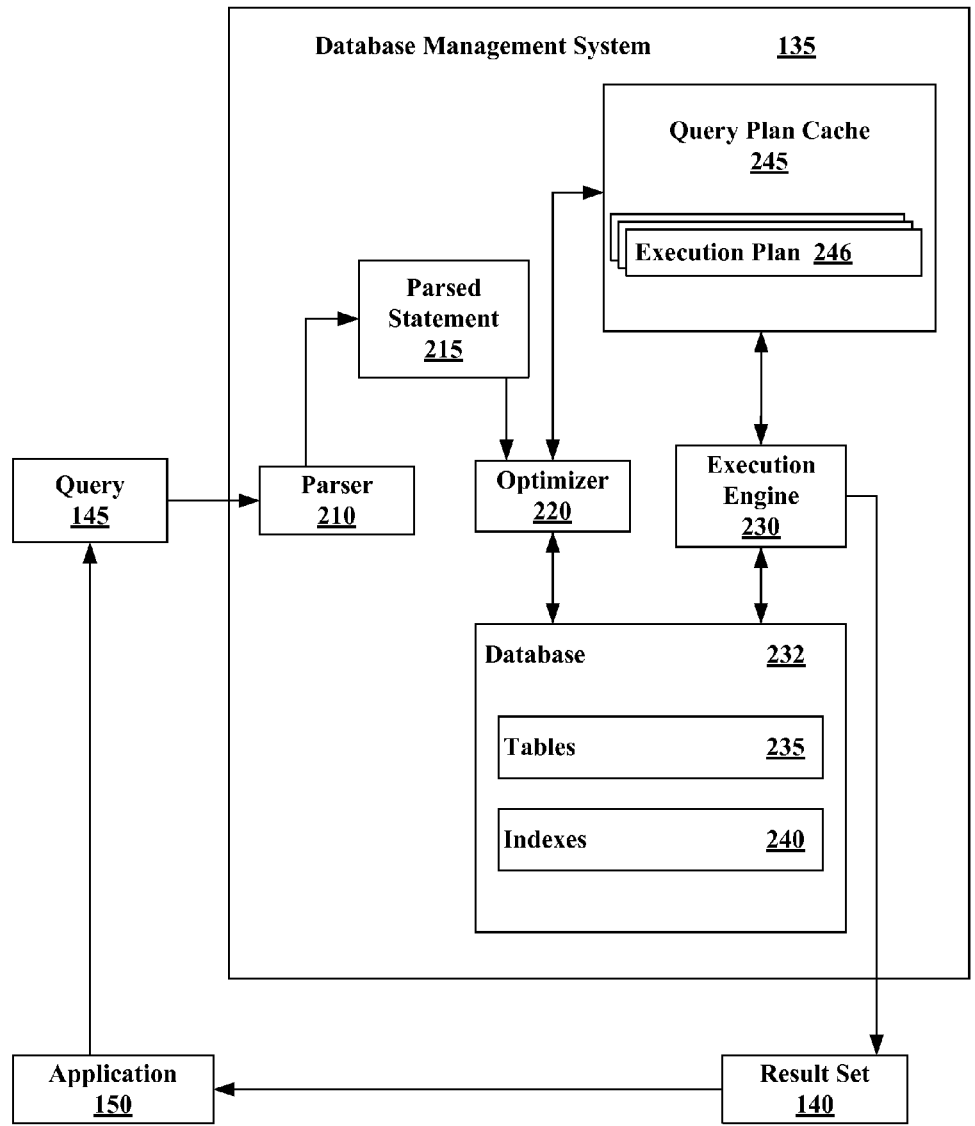
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
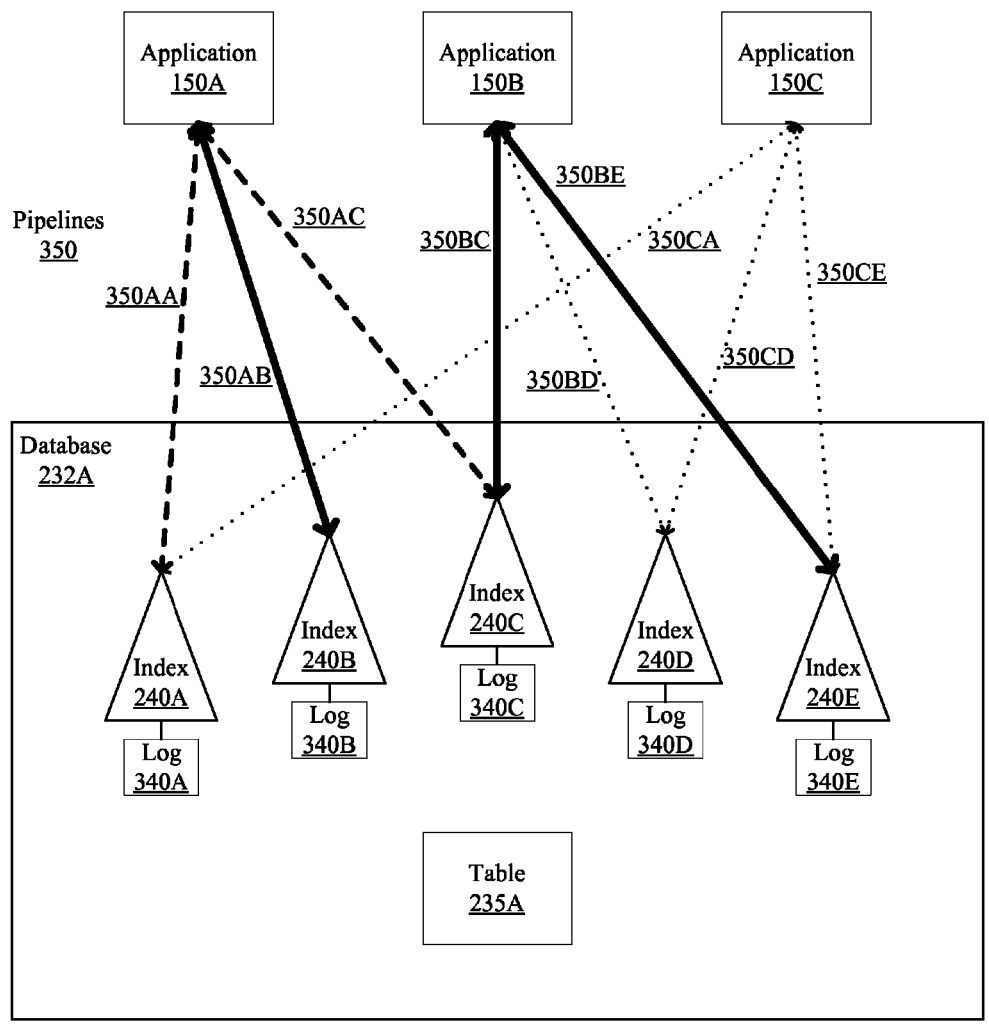
FIG. 3 illustrates an example database and example applications connected by example pipelines according to an embodiment.

FIG. 3 illustrates an example database 232A and example applications 150 connected by example pipelines 350 according to an embodiment. The database 232A may include a table 235A. In embodiments, many rows and many columns may exist in the table 235A. The database 232A may include indexes 240. The indexes 240 may correlate to the table 235A. The indexes 240 may be built over the table 235A. In embodiments, the indexes 240 may improve search times to a desired subset of rows in the table 235A.

The indexes 240 may be maintained to reflect that an entry (i.e. row) has been added, deleted, or changed in the table 235A. In embodiments, applicable indexes 240 over the table 235A may be maintained whenever associated data in the table 235A is added, deleted, or changed. In embodiments, the indexes 240 may order row references into an order based on key columns specified for the particular index such as particular indexes 240A, 240B, 240C, 240D, 240E. Each of indexes 240A, 240B, 240C, 240D, 240E may have a particular key column. Ordering of row references of the indexes 240 may be distinct from an order of rows of the table 235A.

The indexes 240 of the database 232A may be connected to applications 150 by pipelines 350. Application 150A may connect with index 240A via pipeline 350AA. Application 150A may connect with index 240B via pipeline 350AB. Application 150A may connect with index 240C via pipeline 350AC. Application 150B may connect with index 240C via pipeline 350BC. Application 150B may connect with index 240D via pipeline 350BD. Application 150B may connect with index 240E via pipeline 350BE. Application 150C may connect with index 240A via pipeline 350CA. Application 150C may connect with index 240D via pipeline 350CD. Application 150C may connect with index 240E via pipeline 350CE.

Applications 150 may search the indexes 240 via pipelines 350. Pipelines 350 may be open and active such as pipelines 350AB, 350BC, 350BE. Open and active pipelines 350AB, 350BC, 350BE are represented by a solid line in FIG. 3. Open and active pipelines may be associated with indexes being searched 240B, 240C, 240E. In embodiments, a particular open and active pipeline may have a search request that is actively in use associated with the particular application and the particular index connected by the particular open pipeline. Pipelines 350 connecting applications 150 and indexes 240 associated with the search request may be considered open. In embodiments, flow may be data flow. In embodiments, flow related to the particular application may be such that the particular index is being read. Indexes being read may be considered actively in use. In embodiments, at a future time the particular open pipeline may be inactive or closed.

Pipelines 350 may be open and inactive such as pipelines 350AA, 350AC. Open and inactive pipelines 350AA, 350AC are represented by a dashed line in FIG. 3. Open and inactive pipelines may be associated with indexes not being searched 240A when no open and active pipelines are associated with the particular index. In embodiments, a particular open and inactive pipeline may have a search request that is not actively in use associated with the particular application and the particular index connected by the particular open pipeline. Pipelines 350 connecting applications 150 and indexes 240 associated with the search request may be considered open. In embodiments, flow related to the particular application may be such that the particular index is not being read. Indexes not being read may be considered not actively in use. In embodiments, at a future time the particular open pipeline may be active or closed.

Pipelines 350 may be closed (and thus inactive) such as pipelines 350BD, 350CA, 350CD, 350CE. Closed pipelines 350BD, 350CA, 350CD, 350CE are represented by a dotted line in FIG. 3. Closed pipelines may be associated with indexes not being searched 240D when no open and active pipelines are associated with the particular index. In embodiments, a particular closed pipeline may not have a search request associated with the particular application and the particular index connected by the particular closed pipeline. Pipelines 350 connecting applications 150 and indexes 240 not associated with the search request may be considered closed. The particular application and the particular index may lack flow. Lack of flow may indicate not actively in use. In embodiments, at a future time the particular closed pipeline may be opened.

Indexes 240 may be associated with logs 340. Each particular index may be associated with a particular log. Specifically, index 240A may be associated with log 340A. Index 240B may be associated with log 340B. Index 240C may be associated with log 340C. Index 240D may be associated with log 340D. Index 240E may be associated with log 340E. The particular log may enable dynamic logging for the particular index over the table 235A when table row maintenance (e.g., additions, deletions, changes) is in effect. When the particular index is not immediately updated with a maintenance request (i.e. delayed maintenance), the maintenance request may be dynamically added to the particular log for the particular index (i.e. dynamic logging).

The maintenance request update may be performed at a later time. The later time may allow for efficient search performance. The later time may allow for batched updates. Batched updates may include multiple rows being updated in one operation. Batched updates may reduce I/O costs, working set memory sizes, CPU consumption, performance overhead, performance penalties, etc. Batched updates may be useful for data warehouses, data marts, and other reporting servers.

In embodiments, entries in the particular log may be ordered. Ordering may occur as entries are added to the particular log. Ordering may match indicators such as a key, timestamp, etc. Ordering entries in the particular log may increase maintenance or search efficiency when entries in the particular log are added to the particular index. Duplicate entries may be accounted for. For example, an update to a particular row may occur multiple times while the particular row is present in the particular log. In some cases, only the latest update is relevant and needs to be updated in the particular index. Therefore, actual maintenance to the particular index is decreased, potentially having positive implications such as reduced I/O costs, working set memory sizes, CPU consumption, performance overhead, performance penalties, etc.

Figure 4:
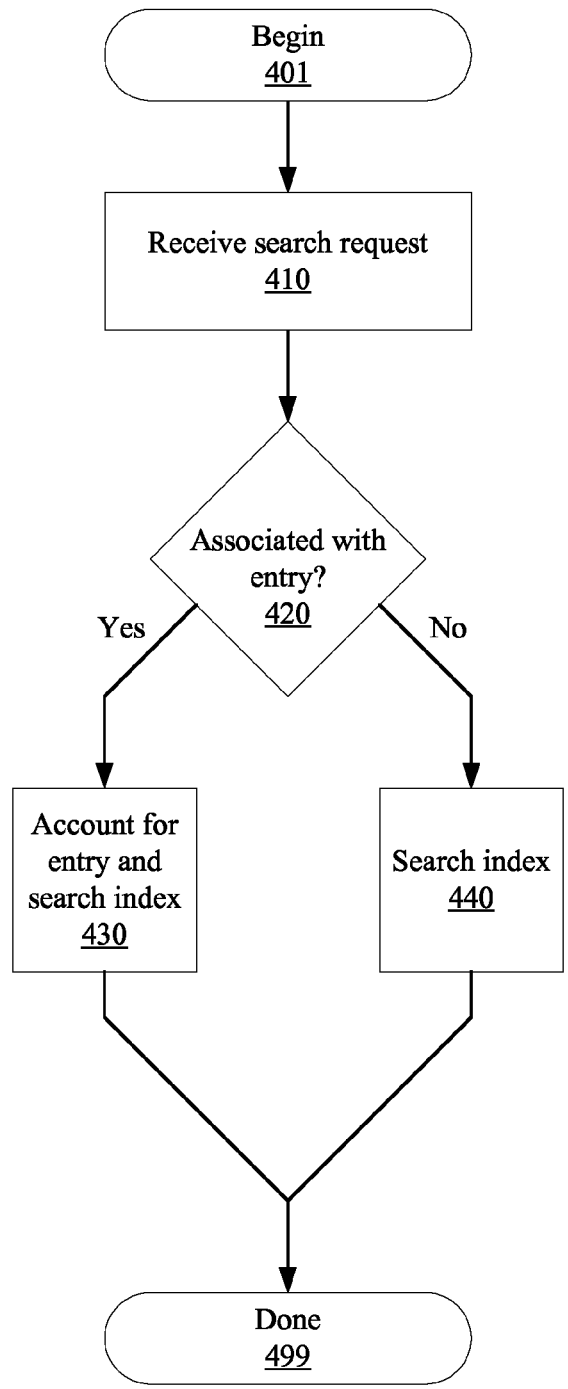
FIG. 4 is a flowchart illustrating an operation to manage a database according to an embodiment.

FIG. 4 is a flowchart illustrating an operation 400 to manage a database according to an embodiment. Operation 400 may begin at block 401. A search request may be received at block 410. An application may send the search request. The search request may travel a pipeline to a database. The search request may seek particular information by reading particular data of a particular index of the database. The particular index may be associated with a particular log. The particular log may be adapted to include an entry. The entry may be intended to add, delete, or change data of the particular index. The data may be the particular data.

A determination is made at block 420 as to whether the search request is associated with the entry of the particular log that is associated with the particular index. The search request may be considered associated with the entry when the entry affects the particular information sought by the search request. For example, if the search request seeks information on sales transactions in amounts greater than $100, then the entry that is to add to the particular index a sales transaction with an amount of $120 affects the particular data that is the particular information sought by the search request. Therefore, the search request is associated with the entry with an amount of $120.

The search request may be considered not associated with the entry when the entry does not affect the particular information sought by the search request. For example, if the search request seeks information on sales transactions in amounts greater than $100, then the entry that is to add to the particular index a sales transaction with an amount of $75 does not affect the particular data that is the particular information sought by the search request. Therefore, the search request is not associated with the entry with an amount of $75.

Block 430 may occur when the search request is associated with the entry. The entry may be accounted for and the particular index may be searched. In embodiments, at least a portion of the particular index may be updated with the entry. Updating at least a portion of the particular index may include adding, deleting, or changing a row of the particular index. Searching may resume or continue. In embodiments, searching may be paused to permit the addition, deletion, or change of the entry or row of the particular index. In other embodiments or technologies, it is contemplated that searching may not be paused or may be paused multiple times.

In embodiments, the search request may be considered associated with the entry whenever the particular log is not empty. The particular log may be not empty when the particular log contains at least one entry. In such embodiments, the particular index may be updated when the particular log is not empty. In embodiments, the particular index may be updated with the entry and then searching may commence. In embodiments such as when the particular log contains a sufficiently small number of entries, searching may be divided into two phases. One phase may include searching the particular index. Another phase may include searching the particular log. Results from the two phases may be merged to achieve a final answer. The final answer may be associated with the entry. The final answer may take into account entries in the particular log that may alter outcomes. For example, entries of the particular log deleting rows of the particular index may alter outcomes and the final answer may account for such scenarios. A variety of combinations of accounting for entries and searching are contemplated.

Block 440 may occur when the search request is not associated with the entry. In embodiments, the particular log may be empty. The particular log may be empty when the particular log contains zero entries. The particular index may be searched. The particular index may not be immediately updated with the entry. The particular index may be updated with the entry at a later time. The later time may allow for batched updates. Batched updates may include multiple rows being updated in one operation. Batched updates may reduce I/O costs, working set memory sizes, CPU consumption, performance overhead, performance penalties, etc. Batched updates may be useful for data warehouses, data marts, and other reporting servers.

In embodiments, entries in the particular log may be ordered. Ordering may occur as entries are added to the particular log. Ordering may match indicators such as a key, timestamp, etc. Ordering may be done in accordance with entries associated with the search request. Duplicate entries may be accounted for. For example, an update to a particular row may occur multiple times while the particular row is present in the particular log. In some cases, only the latest update is relevant and needs to be updated in the particular index. Therefore, actual maintenance to the particular index is decreased, potentially having positive implications such as reduced I/O costs, working set memory sizes, CPU consumption, performance overhead, performance penalties, etc. Operation 400 concludes at block 499.

Operation 400 may promote efficient searching. Operation 400 may make access to indexes more predictable. Operation 400 may include settings automatically determined by a database management system (DBMS). Operation 400 may include settings configured by a user such as a database administrator.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system, comprising:
one or more processors; and
program code including a query optimizer, the one or more processors configured to execute the program code to process a database query, the program code configured to:
structure a database to have a table, an index associated with the table, and a log associated with the index, wherein the log is configured to include an entry;
receive a first search request related to the index;
determine that the first search request is not associated with the entry, wherein:
the first search request is associated with the entry if the entry affects any information sought by the first search request, wherein the entry affects information sought by the first search request if a pipeline between an application and the index is open and active, and the first search request is not associated with the entry if:

a pipeline between an application and the index is either closed or open, but inactive, wherein the pipeline being either closed or open, but inactive includes:
the pipeline being open, but inactive, wherein the pipeline being open, but inactive includes:
receiving a second search request, the second search request being associated with the application, and wherein the index that is connected by the pipeline, which is open, is not actively in use; and
the pipeline being either closed or open, but inactive includes the pipeline being closed, wherein the pipeline being closed includes a determination that the pipeline connecting the application and the index is not associated with a previous search request; and
search the index in response to determining that the search request is not associated with the entry.

2. The system of claim 1, wherein the search request is not associated with the entry if the log contains zero entries.

3. The system of claim 1, wherein the program code is further configured to:
determine that the search request is associated with the entry;
account for the entry in response to determining that the search request is associated with the entry, wherein account for the entry includes updating at least a portion of the index; and
search the index using the search request.

4. The system of claim 3, wherein updating at least a portion of the index includes:
pausing, in response to determining the search request is associated with the entry, search of the index;
changing, in response to pausing search of the index, a row of the index; and
resuming, in response to changing the row of the index, search of the index.

5. The system of claim 1, wherein the program code is further configured to:
determine that the search request is associated with the entry;
search the index, using the search request; and
account for the entry in response to determining that the search request is associated with the entry, wherein account for the entry includes searching the log and merging results from searching the log and searching the index.

6. The system of claim 5, wherein searching the log and merging results from searching the log and searching the index includes:
determining the log has a number of entries below a threshold;
searching, using the search request, the log in response to determining the log has the number of entries below the threshold;
merging, in response to both searching the index and searching the log, results of both searching the index and searching the log; and
generating a final answer for the search request based on the merged results.

7. The system of claim 1, wherein the program code is further configured to:
determine that the search request is associated with the entry;
search the index using the search request; and
account for the entry in response to determining that the search request is associated with the entry, wherein account for the entry includes answering with a result associated with the entry.

8. The system of, wherein the determining that the pipeline is not both open and active includes a determination of a lack of data flow in the pipeline.

9. The system of claim 1, wherein the entry does not affect information sought by the search request when a first data value of the entry does not meet a first data value threshold of the search request.

10. The system of claim 9, wherein the entry affects information sought by the search request when a second data value of the entry meets a second data value threshold of the search request.

11. The system of claim 1, wherein the program code is further configured to:
batch updates, in response to determining the search request is not associated with the entry, wherein batch updates includes configuring an update of multiple rows for one operation for performance at a later time to reduce input/output costs, working set memory sizes, central processing unit consumption, and performance overhead.

12. A system comprising:
one or more processors; and
program code including a query optimizer, the program code configured to be executed by the one or more processors to process a database query, the program code configured to:
structure a database to have a table, an index associated with the table, and a log associated with the index, the log configured to include an entry;
receive a first search request related to the index;
determine, using both the entry and information sought by the search request, that the first search request is not associated with the entry, wherein:
the first search request is associated with the entry if the entry affects any information sought by the first search request, wherein the entry affects information sought by the first search request if a pipeline between an application and the index is open and active,
a pipeline between an application and the index is either closed or open, but inactive, and the pipeline being either closed or open, but inactive includes:
the pipeline being open, but inactive, wherein the pipeline being open, but inactive includes:
receiving a second search request, the second search request being associated with the application, and wherein the index that is connected by the pipeline, which is open, is not actively in use;
the pipeline being either closed or open, but inactive includes the pipeline being closed, wherein the pipeline being closed includes a determination that the pipeline connecting the application and the index is not associated with a previous search request;
search the index without accounting for the entry: in response to determining that the search request is not associated with the entry; and
account for the entry and search the index: in response to determining the search request is not associated with the entry.

* * * * *